(12) United States Patent
Chung

(10) Patent No.: US 6,347,576 B1
(45) Date of Patent: Feb. 19, 2002

(54) ELECTRIC COOKER

(76) Inventor: Rok Chung, Namdong KongDan 148BL-11LT, Kojan-dong 712-18, Namdong-ku, Incheon (KR)

( * ) Notice: Subject to any disclaimer, the term of this patent is extended or adjusted under 35 U.S.C. 154(b) by 0 days.

(21) Appl. No.: 09/859,037

(22) Filed: May 16, 2001

(51) Int. Cl.[7] .............................. A23L 1/00; A47J 37/00; H05B 1/00
(52) U.S. Cl. ..................... 99/331; 99/422; 99/DIG. 14; 99/426; 219/432; 219/621
(58) Field of Search ...................... 99/326–333, 339, 99/340, 403, 426, 422–425, 444–450, 451, DIG. 14; 219/432, 430, 433, 438, 439, 467.1, 521, 621–624, 647, 660, 459.1, 468.1, 454.11, 463.1; 126/39 E; D7/355

(56) References Cited

U.S. PATENT DOCUMENTS

| | | | | |
|---|---|---|---|---|
| 3,213,849 A | * | 10/1965 | Hirsch | 99/331 X |
| 3,636,299 A | * | 1/1972 | Stewart, Jr. | 108/94 X |
| 3,851,599 A | * | 12/1974 | Bridges | 108/25 |
| 3,972,419 A | * | 8/1976 | Short | 211/78 |
| 4,435,638 A | * | 3/1984 | Simon et al. | 219/432 |
| 4,492,853 A | * | 1/1985 | Lam | 219/432 |
| 4,555,616 A | * | 11/1985 | O'Brien | 219/432 |
| 5,032,699 A | * | 7/1991 | Hu | 219/621 |
| 5,129,314 A | * | 7/1992 | Hu | 99/422 |
| 5,203,255 A | * | 4/1993 | Well et al. | 99/483 |
| 5,239,916 A | * | 8/1993 | Hu | 99/422 |
| 5,421,271 A | * | 6/1995 | Sui | 108/50 |
| 5,778,768 A | * | 7/1998 | McClean | 99/422 |

\* cited by examiner

Primary Examiner—Timothy F. Simone
(74) Attorney, Agent, or Firm—Marshall, Gerstein, & Borun

(57) ABSTRACT

An electric cooker includes a rounded bottom member including a flat surface for defining a food receiving space, a thermal transmission member coupled on an outer bottom surface of the rounded bottom member, an insulating member for insulating the rounded bottom member from the thermal transmission member, a base coupled between the heating member and the insulating member for supporting the cooker, and a coupling device for coupling the insulating member, the base and the thermal transmission member to each other.

3 Claims, 3 Drawing Sheets

ELECTRIC COOKER

BACKGROUND OF THE INVENTION (a) Field of the Invention

The present invention relates to an electric cooker, and more particularly, to an electric cooker with a multi-layered bottom plate assembly, which is formed in a rounded shape including a flat surface.

(b) Description of the Related Art

Generally, a cooker with a multi-layered bottom plate assembly is assembled through a high frequency induction heating method. Korean unexamined patent No. 1998-43015 discloses such a cooker having a multi-layered bottom plate assembly through the high frequency induction heating method.

The cooker disclosed in the patent has a bottom plate formed of three layers which are different in their material.

Such a cooker is designed to improve the thermal transmission, thereby effectively cooking food using a special heating device such as a microwave oven. However, as the special heating device has to be used to cook food, it is inconvenient to use the cooker.

SUMMARY OF THE INVENTION

Accordingly, the present invention has been made in an effort to solve the above-described problem.

It is an objective of the present invention to provide an electric cooker that is improved in its thermal transmission and can be used without additional heating device.

To achieve the above objective, the present invention provides an electric cooker comprising a rounded bottom member including a flat surface for defining a food receiving space, the rounded bottom member being made of stainless steel, a thermal transmission member coupled on an outer bottom surface of the rounded bottom member, the thermal transmission member being integrated with a heating member operated by an electric source and being made of aluminum material, an insulating member for insulating the rounded bottom member from the thermal transmission member, the insulating member mounted on the thermal transmission member, a base coupled to both the heating member and the insulating member for supporting the cooker, and coupling means for coupling the insulating member, the base, and the thermal transmission member to each other.

Preferably the coupling means comprises a support plate coupled on an outer bottom surface and provided with a central hole, a fixing member inserted through a central hole of the insulating member and the central hole of the support plate, the fixing member having locking members provided at its opposite ends for securely fixing the support plate and the insulating member, and an elastic member disposed around the fixing member for biasing the insulating member to the thermal transmission member.

Preferably, the insulating member is made of an elastic material.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION OF THE PREFERRED EMBODIMENTS

A preferred embodiment of the present invention will be described hereinafter with reference to accompanying drawings.

Figure 1:
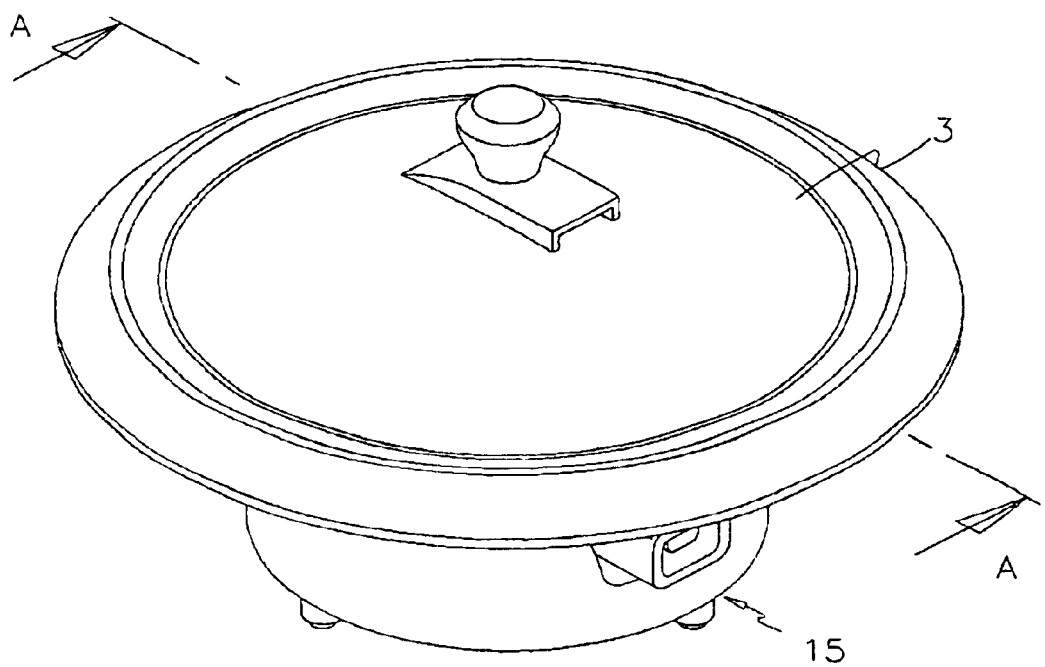
FIG. 1 is a view illustrating an electric cooker according to a preferred embodiment of the present invention.
Figure 2:
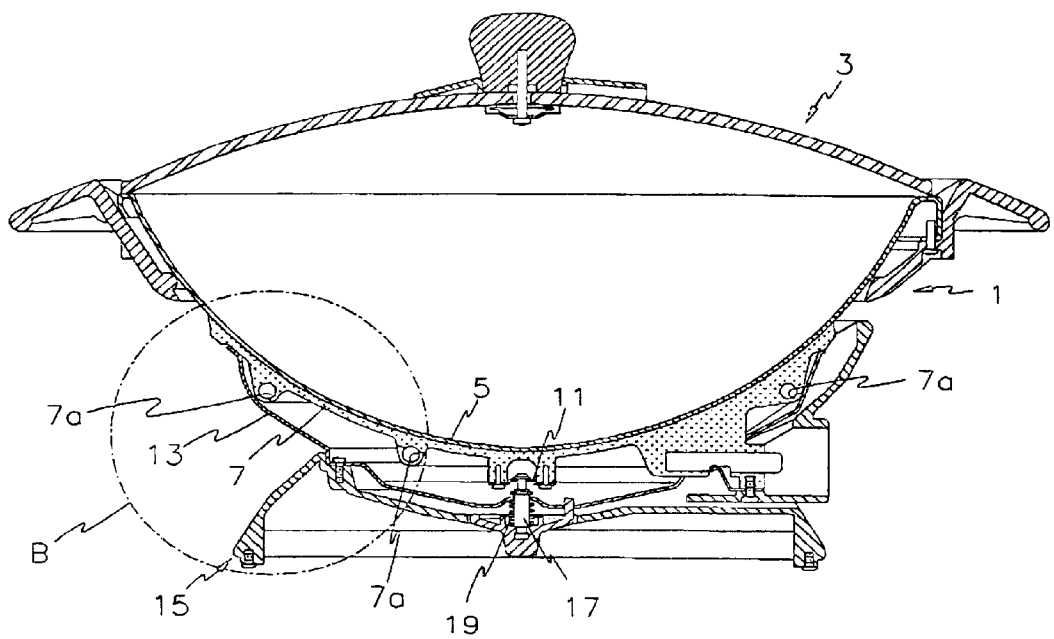
FIG. 2 is a sectional view taken along the line A—A of FIG. 1.

FIG. 1 shows a cooker according to a preferred embodiment of the present invention, and FIG. 2 shows a sectional view taken along the line A—A of FIG. 1 in which a body 1 and a lid 3 of the cooker are shown.

Figure 3:
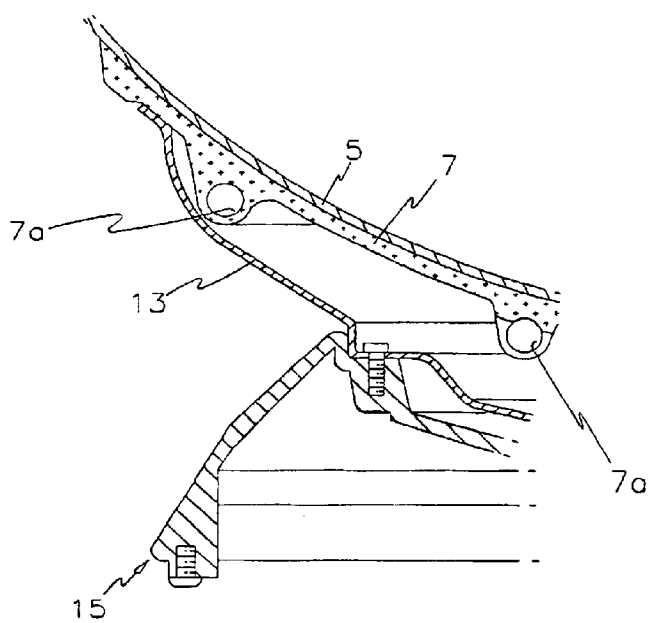
FIG. 3 is an enlarged view of a part B in FIG. 2.
Figure 4:
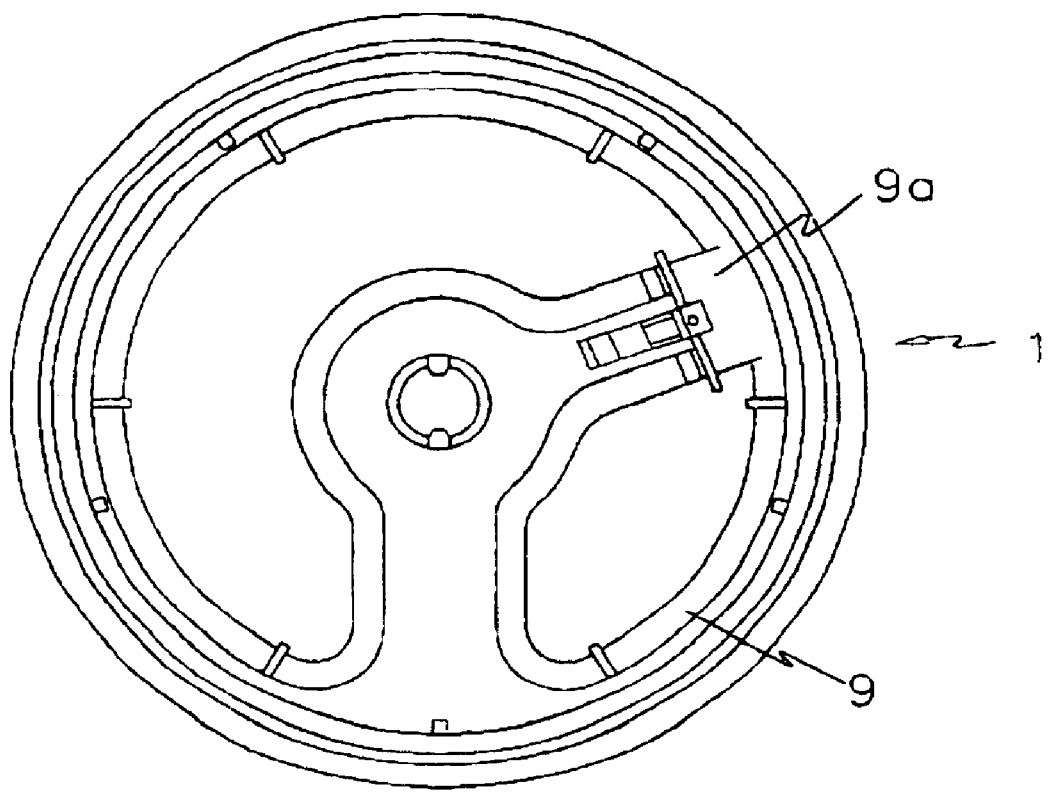
FIG. 4 is a view illustrating a major part of a bottom of a cooker according to a preferred embodiment of the present invention.

The body 1 of the cooker defines a space in which the food is cooked. A bottom member 5 is rounded while having a flat portion. Preferably, the rounded bottom member 5 is made of stainless steel. In addition, a thermal transmission member 7 is mounted on an outer bottom surface of the bottom member 5. The thermal transmission member 7 is made of aluminum or an aluminum alloy and formed through a centrifugal separating press casting process. As shown in FIG. 3, the thermal transmission member 7 is provided with a plurality of spaces 7a. As shown in FIG. 4, a heating member 7 such as a heating coil is inserted into the spaces 7a when the heating member 9 is formed. That is, in a state where the heating member 9 is disposed in the thermal transmission member 7, the thermal transmission member 7 is press-cast in a rounded shape including a flat surface. The heating member 9 is round-shaped so that it can uniformly heat the rounded bottom member 5 having a partly flat surface. In addition, the heating member 9 comprises a plug part 9a for selectively connecting with an electric source. The coupling of the rounded bottom member 5 and the thermal transmission member 7 is realized through a conventional high frequency induction heating process, flux being disposed on the coupling portion so that the coupling process can be quickly realized. The flux is a mixture of about 70% of aluminum powder and about 30% of a detergent.

A supporting plate 11 is mounted on the bottom of the thermal transmission member 7 by a bolt. The supporting plate 11 is provided with a hole at its central portion.

Coupled under the thermal transmission member 7 is an insulating member 13 for preventing the thermal transmission member 7 from being exposed. The insulating member 13 is made of elastic stainless steel. It is preferable that the insulating member 13 is mounted under the thermal transmission member 7 such that it is flexible in a direction of the central axis of the body 1. In addition, the insulating member 13 is provided with a hole corresponding to the central hole of the supporting plate 11. Coupled under the insulating member 13 is a base 15 for supporting the body 1 on the ground. Outer edge of the base 15 is bent and extended downward so as to stably support the body 1. The base 15 is also provided with a hole corresponding to the central hole of the supporting plate 11.

A fixing member 17 is fixedly inserted into the holes of the supporting plate 11, the insulating member 13 and the base 15. The fixing member 17 is provided at its opposite ends with locking members for fixing the supporting plate 11, the insulating member 13 and the base 15. The locking members may be screw-coupled on or integrally formed with the opposite ends of the fixing member 17.

Furthermore, disposed between the insulating member 13 and the base 15 around the fixing member 17 is an elastic member 19 such as a coil spring for biasing the insulating member 13 to the body 1. Accordingly, outer shock applied to the body 1 can be absorbed by the elastic force of both the insulating member 13 and the elastic member 19.

In the above described cooker, the rounded bottom member 5 made of stainless steel and the thermal transmission member 7 are coupled to each other by flux through a high-frequency induction heating process go as to reduce the coupling process time and enhance the attaching state. This coupling method is effective for coupling the rounded bottom member 5 including a flat surface with the thermal transmission member 7 made of aluminum.

After the above coupling process, the fixing member 17 is inserted into the holes formed on the supporting plate 11, the insulating member 13 and the base 15 to fix them, and at the same time, the elastic member 19 is fitted between the insulating member 13 and the base 15, after which the insulating member 13 is fixed on the thermal transmission member 7 by the locking member of the fixing member 17 so that the thermal transmission member 7 is not exposed. At this point, since the edge of the insulating member 13 is designed to elastically support the cooker body 1, the assembling process can be easily realized. In addition, since the base 15 and the insulating member 15 are securely fixed to each other, the cooker can be conveniently used in a state where it is supported on the ground.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An electric cooker comprising:

a rounded bottom member including a flat surface for defining a food receiving space, the rounded bottom member being made of stainless steel;

a thermal transmission member coupled an an outer bottom surface of the rounded bottom member, the thermal transmission member being integrated with a heating member operated by an electric source and being made of aluminum material;

an insulating member for insulating the rounded bottom member from the thermal transmission member, the insulating member mounted on the thermal transmission member;

a base coupled to both the heating member and the insulating member for supporting the cooker; and coupling means for coupling the insulating member, the base, and the thermal transmission member to each other.

2. The electric cooker of claim 1 wherein the coupling means comprises:

a support plate coupled on an outer bottom surface and provided with a central hole;

a fixing member inserted through a central hole of the insulating member and the central hole of the support plate, the fixing member having locking members provided at its opposite ends for securely fixing the support plate and the insulating member; and an elastic member disposed around the fixing member for biasing the insulating member to the thermal transmission member.

3. The electric cooker of claim 1 wherein the insulating member is made of an elastic material.

* * * * *